US007843609B2

(12) United States Patent
Caster et al.

(10) Patent No.: US 7,843,609 B2
(45) Date of Patent: Nov. 30, 2010

(54) MOTION CONTROL METHOD AND APPARATUS FOR A FLAT BED SCANNER

(75) Inventors: Gregory D. Caster, Lexington, KY (US); Brian K. Owens, Lexington, KY (US); Donald N. Spitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 868 days.

(21) Appl. No.: 10/957,028

(22) Filed: Sep. 30, 2004

(65) Prior Publication Data

US 2006/0072179 A1 Apr. 6, 2006

(51) Int. Cl.
*H04N 1/04* (2006.01)
*H04N 1/36* (2006.01)

(52) U.S. Cl. .............. 358/474; 358/400; 358/406; 358/486; 358/494; 358/497; 382/312; 382/318

(58) Field of Classification Search ............ 358/400, 358/471, 474, 494, 496, 500, 462, 497, 486; 382/312, 318
See application file for complete search history.

(56) References Cited

U.S. PATENT DOCUMENTS

| | | | | |
|---|---|---|---|---|
| 4,605,970 A * | 8/1986 | Hawkins | .................... | 358/406 |
| 5,239,387 A * | 8/1993 | Stein et al. | .................. | 358/444 |
| 5,719,404 A | 2/1998 | Tsai | | |
| 5,818,610 A * | 10/1998 | Bromley et al. | ............. | 358/473 |
| 5,963,343 A | 10/1999 | Kubo et al. | | |
| 5,970,181 A | 10/1999 | Ohtsu | | |
| 6,144,467 A * | 11/2000 | Tsai | ............................ | 358/486 |
| 6,178,015 B1 * | 1/2001 | Lee et al. | ..................... | 358/486 |
| 6,229,629 B1 | 5/2001 | Tsai | | |
| 6,353,486 B1 * | 3/2002 | Tsai | ............................ | 358/474 |
| 6,381,043 B1 | 4/2002 | Tsai et al. | | |
| 6,470,099 B1 * | 10/2002 | Dowdy et al. | ............... | 382/287 |
| 6,687,024 B1 | 2/2004 | Short et al. | | |
| 6,728,011 B1 * | 4/2004 | Tsai | ............................ | 358/487 |
| 7,099,054 B2 * | 8/2006 | Shih et al. | .................... | 358/474 |
| 7,116,845 B2 * | 10/2006 | Chen et al. | .................. | 382/318 |
| 7,136,200 B2 * | 11/2006 | Chen et al. | .................. | 358/474 |
| 7,136,204 B2 * | 11/2006 | Chang et al. | ................ | 358/486 |
| 2002/0105683 A1* | 8/2002 | Chen et al. | .................. | 358/462 |
| 2003/0095294 A1* | 5/2003 | Shih et al. | ................... | 358/497 |
| 2004/0160647 A1 | 8/2004 | Satake | | |

* cited by examiner

*Primary Examiner*—Twyler L Haskins
*Assistant Examiner*—Kent Yip
(74) *Attorney, Agent, or Firm*—Justin M. Tromp; John Victor Pezdek

(57) ABSTRACT

A method of scanning a target image and inhibiting backtrack artifacts from the scanned image comprises the steps of initiating a scan on a flat bed scanner, the flat bed scanner comprising at least a scanbar, a memory buffer and a motion control pattern comprised of a plurality of spaced elements, each element having an angled portion with respect to the motion of the scanbar; acquiring scan data comprising a motion control pattern data and an image data with said scanbar; storing the previously acquired scan data in a memory buffer; querying whether the memory buffer reaches a preselected full threshold; acquiring a last valid scan data; stopping and backtracking the scanbar when the memory buffer preselected full threshold is met; and, inhibiting backtrack artifacts by one of a first real-time position analysis or a post-processing analysis.

44 Claims, 9 Drawing Sheets

MOTION CONTROL METHOD AND APPARATUS FOR A FLAT BED SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTINGS, ETC.

None.

BACKGROUND

1. Field of the Invention

The present invention provides an improved motion control method and apparatus for a flat bed scanner. More specifically, the present invention provides a method for eliminating backtrack artifacts and scanning errors associated with backtracking operations.

2. Description of the Related Art

Scanners are used to scan a target image and create scanned image data which can be displayed on a computer monitor, which can be used by a computer program, which can be printed, which can be faxed, etc. Scanned data may be saved to memory or a magnetic or optical drive, or other fixed or removable memory device. Scanning devices may be packaged in a stand-alone housing or as part of a multi-function peripheral, including a printing component to perform scanning as well as standard copying functions.

Scanners typically include a housing aperture defined by an edge wherein a platen is located. A target document is positioned on the platen for scanning of the text or image by a scanbar. Depending on the positioning of the scanbar relative to the platen, the platen may be transparent where the scanbar is beneath the platen or may be solid where the scanbar is above the platen. For a typical flatbed scanner, the scanbar will be below the platen, which will have a transparent section to allow for the scan operation.

In a conventional scanning operation the scanbar starts out in a home position as determined by an origin or home reference. By having the scanbar locate the scanbar home reference before starting a scan, the scanner is able to establish an accurate position reference for the scanbar each time the scanbar moves from the scanbar home. In addition, the scanbar will also calibrate the sensor elements to a known white (or other color) surface and, optionally, to a known black surface before performing a scan of the image. In some instances a prescan is performed. A prescan of the image is performed by moving the scanbar along the major axis (typically, the length of the platen aperture area) in relation to or over the image for the length of the platen. The scanner obtains information about the image from the prescan which the scanner uses for the subsequent image scan of the image. If a prescan is performed, the scanbar is returned to the scanbar home reference to reestablish an accurate position for the scanbar. An image scan is performed by first moving the scanbar to a constant velocity and then continuing the scanbar at that constant velocity along the major axis in relation to or over the image. After the image scan, the scanbar is returned to the scanbar home reference to reestablish an accurate position for the scanbar and to await the next image. In other instances the prescan method is omitted.

Conventional flat bed scanners use either a stepper motor in an open loop control system or a DC motor in a closed loop system to move the scanbar in a scan direction to perform the prescan and image scan. The scan direction is defined generally as the direction of motion of the scanbar and typically parallels a major, or longer, axis of the platen. A closed loop circuit is a circuit in which the output is continuously fed back to the controller for constant comparison. An open loop circuit, on the other hand, is a control system that does not have means of comparing input and output for control purposes. Regardless of which control system is utilized, a backtracking operation may need to be performed. During a flatbed scan, image data is temporarily stored in an image data buffer. Depending on image content and data transfer rates, the image data buffer may become filled with image data. This happens when image data is coming into the data buffer faster than the image data is processed out of the image data buffer. When a data buffer is full or nearly full of image data, the buffer must empty completely or below a threshold level before the scanbar can resume acquiring scan data. Specifically, the scanbar will stop, reverse direction, or backtrack some pre-selected distance, and stop at some position where data has already been taken. When the buffer level reaches a threshold level that allows for scanning to continue, the scanbar will accelerate to a constant velocity in the scan direction, and resume taking data at a point immediately after the last valid data location.

In either the DC motor closed loop system or the stepper motor open loop system there will be location errors associated with the backtracking operation. In some instances data is duplicated or left out causing backtrack artifacts. Artifacts are image errors in the scan or copy output that are noticeable to the typical user, that appear as dark or light spots or lines in the image output. The artifacts are due to the difference in the actual physical location of the scanbar and location where the processor estimates the scanbar is located. Such positional errors may arise due to mechanical positional tolerances present in the prior art devices. For example, DC motors are typically used in combination with an encoder wheel and a photo interrupter, which detects rotations of the rotary encoder to control the speed of the scanbar and determine location of the scanbar. However, noticeable scan errors arise from differences between actual location and estimated location of the scanbar and are often generated during backtracking steps when the control system assumes that the scanner is at a new location or when a slice of data is skipped because of scanner positioning errors. Such backtracking errors and artifacts are highly undesirable.

Given the foregoing, it will be appreciated that a method is needed which eliminates scanning errors and backtrack artifacts associated therewith.

SUMMARY OF THE INVENTION

A method of scanning a target image and inhibiting backtrack artifacts from the scanned image comprises the steps of initiating a scan on a flat bed scanner, the flat bed scanner comprising at least a scanbar, a memory buffer and a motion control pattern; acquiring scan data comprising a motion control pattern data and an image data with said scanbar; storing the previously acquired scan data in a memory buffer; querying whether the memory buffer reaches a preselected full threshold; acquiring a last valid scan data; stopping and backtracking the scanbar when the memory buffer preselected full threshold is met; and, inhibiting backtrack artifacts by one of a first real-time position analysis or a post-processing analysis. The motion control pattern is comprised of a plurality of spaced marks, each mark having a portion that is angled or sloped with respect to the direction of motion of the scanbar.

According to the first real-time positional analysis, the method further comprises accelerating the scanbar in a scanning direction when the memory buffer is below a preselected empty threshold. The method further comprises acquiring a new scan data point and comparing the new scan data point to the previously acquired scan data. The method further comprises acquiring a new motion control pattern data point and comparing the new motion control pattern data point to the previously acquired scan data comprising the motion control data. The method further comprises synchronizing a new scanbar position to an old scanbar position by correlating a new scan data to the previously acquired scan data. The method further comprises resuming scanning immediately following the last valid scan data. The method further comprises resuming scanning when a preselected empty memory buffer threshold is met. The method further comprises resuming the scanning at a distance equal to at least a mechanical positional tolerance before a last valid scan data position. The method further comprises resuming the scanning at a distance equal to a mechanical positional tolerance and a distance required to accelerate to a constant scan velocity.

According to the second post-processing method, the method further comprises comparing the last valid scan data to a new scan data comprising the motion control pattern data after the scan is complete. The method further comprises deleting duplicate motion control pattern data and image data. The method further comprises piecing together scan data by comparing the scanned motion control pattern data and the previously acquired motion control pattern data to form an image comprising the image data. The method further comprises comparing the previously acquired scan data to a new scan data point comprising the motion control pattern data after the scan is complete. The method further comprises deleting duplicate motion control pattern data and image data. The method further comprises piecing together scan data by comparing the scanned motion control pattern data and the previously acquired motion control pattern data to form an image comprising the image data.

DETAILED DESCRIPTION

Referring now in detail to the drawings, wherein like numerals indicate like elements throughout the several views, there are shown in FIGS. 1-9 various aspects of an improved motion control method and apparatus for a flat bed scanner. The device generally provides two functions. According to a first function, the improved motion control method provides feedback for real-time locational positioning of the scanbar or carriage. According to a second function, the improved motion control method provides a key for piecing together scan data in post-processing thereby substantially inhibiting backtrack artifacts.

Figure 1:
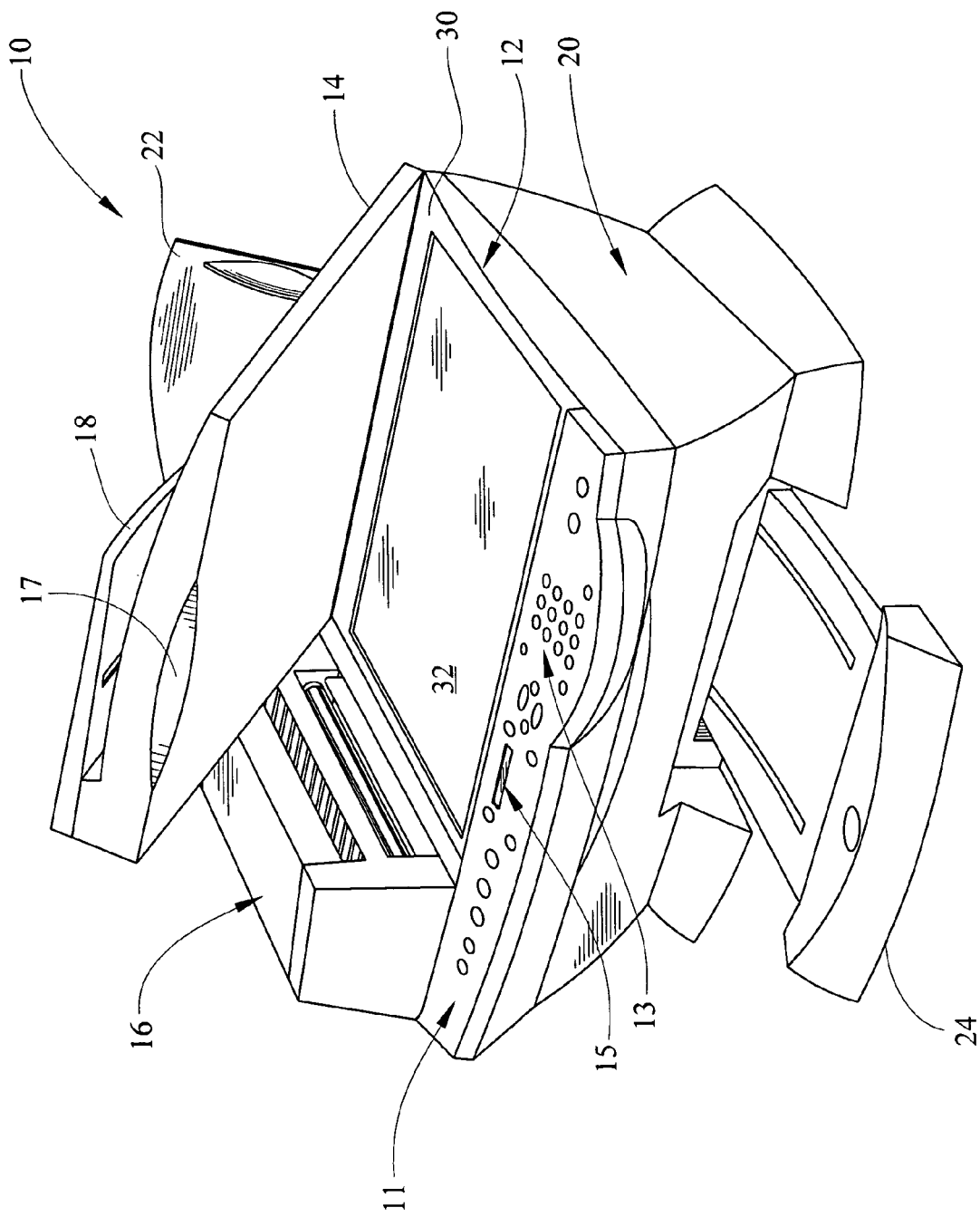
FIG. 1 is a perspective view of a peripheral device having a flat bed scanner.

Referring initially to FIG. 1, a multi-function peripheral device 10 is shown having a flat bed scanner portion 12 and a printer portion generally defined by a housing 20. The multi-function peripheral device 10 is shown and described herein for purpose of clarity, however one of ordinary skill in the art will understand upon reading of the instant specification that the present invention may be utilized with a stand alone flat-bed scanner. The peripheral device 10 further comprises a control panel 11 having a plurality of buttons 13 for making selections. The control panel 11 also includes a graphics display 15 to provide a user with menus, choices or errors occurring with the system.

The printer portion 20 comprises an input tray 22 at the rear of the device 10 and an exit tray 24 at the front of the device 10. The input tray 22 is substantially vertical in orientation while the exit tray 24 is horizontal. Therefore the input tray 22 and output tray 24 define an L-shaped paper path. Alternatively, a C-shaped path may be utilized instead wherein both the input tray 22 and the exit tray 24 are disposed on the front surface of the printer housing 20.

Referring still to FIG. 1, the flat bed scanner portion 12 generally includes a lid 14 which is pivotally connected to the peripheral housing along an upper rear edge of the peripheral housing 20. Along a front edge of the lid 14 is a handle 17 for opening of the lid 14 and placement of the target document on a transparent platen 32. Beneath the lid 14, the transparent platen 32 provides for placement and support of target or original documents for manual scanning. The platen 32 is generally rectangular in shape having two longer parallel sides defining a major axis and two shorter parallel sides defining a minor axis. Surrounding the platen 32 is a scanner top housing 30 which is also substantially rectangular in shape. Adjacent the lid 14 is an auto-document feeder 16 which automatically feeds and scans stacks of documents which are normally sized, e.g. letter or A4, and suited for automatic feeding. Above the lid 14 and adjacent an opening in the auto-document feeder 16 is an auto-document feeder input tray 18 which supports the target documents to be fed to the auto-document feeder 16. Beneath the input tray 18, the lid 14 also functions as an output tray for receiving documents fed through, and scanned by, the auto-document feeder 16.

Figure 2:
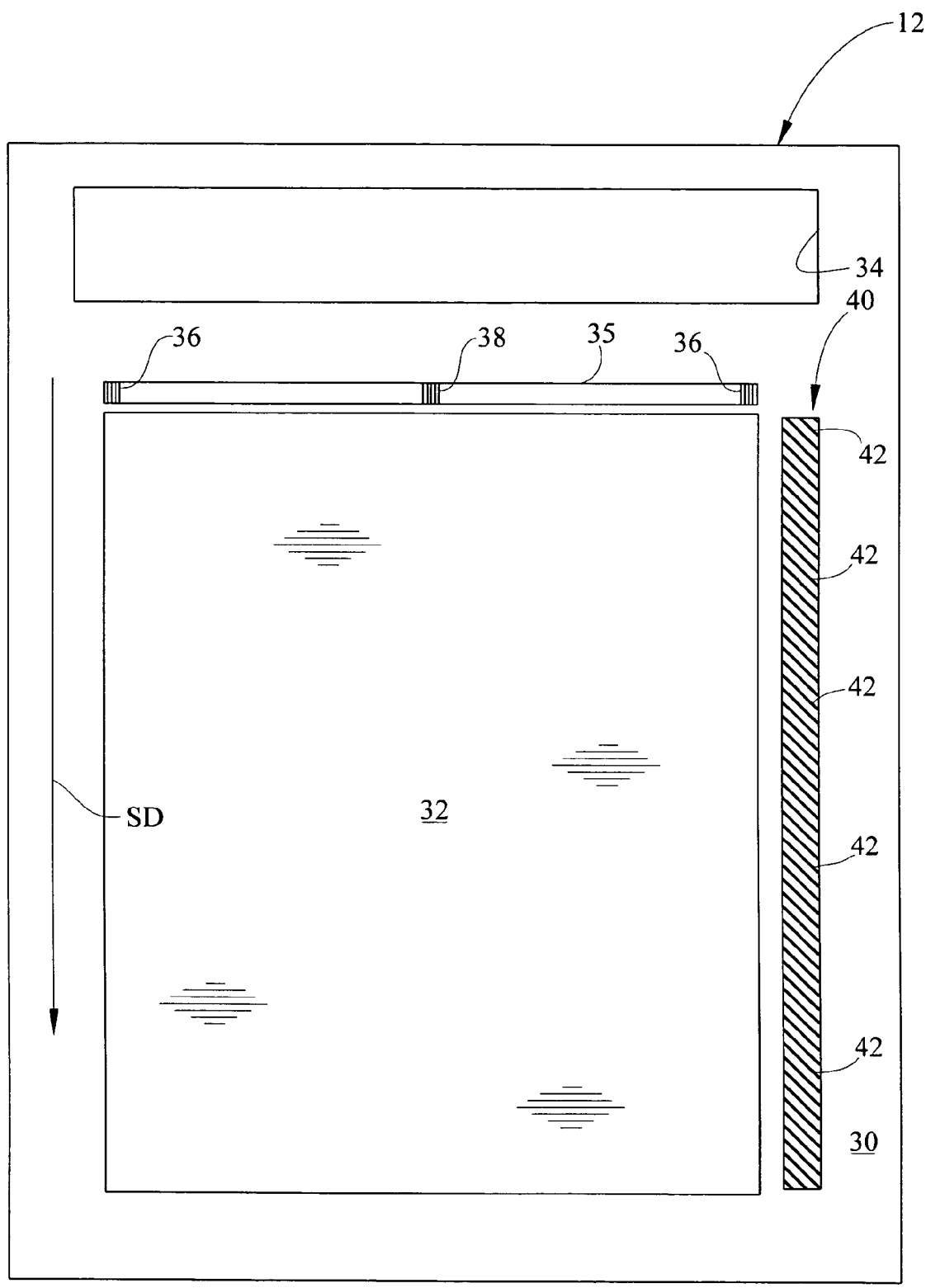
FIG. 2 is a bottom view of the scanner housing with motion control pattern and scanbar.

Referring now to FIG. 2, a bottom view of a lower surface of scanner housing 30 is shown within the flat bed scanner 12. At one end of scan housing 30 a scanbar or scan carriage 34 is depicted within the scanner 12 and operates by a plurality of parts which are not shown but generally described herein. The scanbar 34 can be driven by scanbar motor and drive, which connects the scanbar motor and a scanbar 34, thereby moving the scanbar 34 beneath the platen 32. The scanbar 34 moves bi-directionally along the major axis, with the normal scan direction represented by the arrow SD. From the home position shown in FIG. 2, the scanbar 34 moves toward the platen 32 in the scanning direction and in a reverse direction from beneath the platen 32 to the home position. At least one guide bar (not shown) can be disposed within the scanner bed 12 and may extend in the scanning direction. The scanbar 34 moves along the at least one guide bar within the scanner bed 12 beneath the platen 32. Alternatively, guide wires, or other guide means can be utilized to direct the scanbar 34 in the scanning direction and reverse direction.

The scanbar 34 can comprise either an optical reduction type scanner or a contact image sensor (CIS) type. The optical reduction scanner type uses an optical reduction array mounted on a circuit board. The image sensor array comprises a collection of tiny, light-sensitive diodes, which convert photons into electrons. These diodes are called photosites—the brighter the light that hits a single photosite, the greater the electrical charge that will accumulate at that site. The scanbar 34 can include a lamp, an image sensor, and a mirror therein for obtaining a scanned image from a document. The lamp requires a specific warm up time and therefore incurs a delay prior to scanning from a cold start. The mirrors, filters and lenses located within the scanbar direct the image reflected from the original document to the image sensor within the scanbar. The exact configuration of these components will depend on the model of scanner. Some optical reduction scanbars use a three pass scanning method. Each pass uses a different color filter (red, green or blue) between the lens and array. After the three passes are completed, the scanner software assembles the three filtered images into a single full-color image. However, most optical reduction scanners use the single pass method. The lens splits the image into three smaller versions of the original. Each smaller version passes through a color filter (either red, green or blue) onto a discrete section of the array. The scanner software combines the data from the three parts of the array into a single full-color image.

In general, for inexpensive flatbed scanners contact image sensors (CIS) are used in the scanbar 34. A CIS array replaces the optical reduction image sensor array, mirrors, filters, lamp and lens with an array of red, green and blue light emitting diodes (LEDs) and a corresponding array of phototransistors. The image sensor array consisting of 600, 1200, 2400 or 4800 LEDs and phototransistors per inch (depending on resolution), spans the width of the scan area, and is placed very close to the platen 32 upon which rests the image to be scanned. When the image is scanned, the LEDs combine to provide a white light source. The illuminated image is then captured by the row of sensors. Color scanning is done by illuminating each color type of LED separately and then combining the three scans. The CIS scanner utilizes at least one LED, and preferably a plurality of LEDs, to provide a light source requiring no warm-up time. In other words, the CIS is an instant-on device unlike lamps utilized with optical reduction scanners. In either event, the scanbar 34 is positioned beneath the automatic document feeder 16 or moves beneath the platen 32 exposing the original document thereabove to a light source.

Regardless of whether the image sensor is an optical reduction type image sensor or a contact image sensor (CIS), the image sensor then scans the image and sends the scanned data to a processor for processing. The processor then sends data representing the image to onboard memory, a network drive, or a PC or server housing, a hard disk drive or an optical disk drive such as a CD-R, CD-RW, or DVD-R/RW, or other memory device. Alternatively, the original document can be scanned by the optical scanning component and a copy printed from the printer portion 20 in the case of a multifunction peripheral device 10.

Still referring to FIG. 2, the scanbar 34 has a width that is greater than the width of the platen 32. In this configuration the scanbar 34 can make a single pass in the scanning direction and acquire all the image data on the platen 32. Such configuration also ensures that the scanbar 34 acquires the entire motion control pattern 40 when moving in the scanning direction adjacent one edge of the platen 32. The motion control pattern 40 comprises a plurality of spaced marks 42, at least one portion of each is sloped, angled or on a diagonal in relation to the direction of scanbar motion. The motion control pattern 40 allows a much higher level of accuracy than prior art encoder designs because of the scanning resolutions of the image sensors within the scanbar 34. A calibration strip 35 may extend adjacent the minor axis (width) edge of the platen 32. The calibration strip 35 for example, may be a white strip of material which an image sensor within the scanbar 34 utilizes to calibrate before scanning. Also located on the calibration strip can be origin marks 36, 38. Although two origin marks 36, 38 are shown, only one mark is necessary, and, in either case, the second mark is merely an illustrative alternative. The origin marks 36, 38 are utilized to orient the scanbar 34 to its home position.

Figure 3:
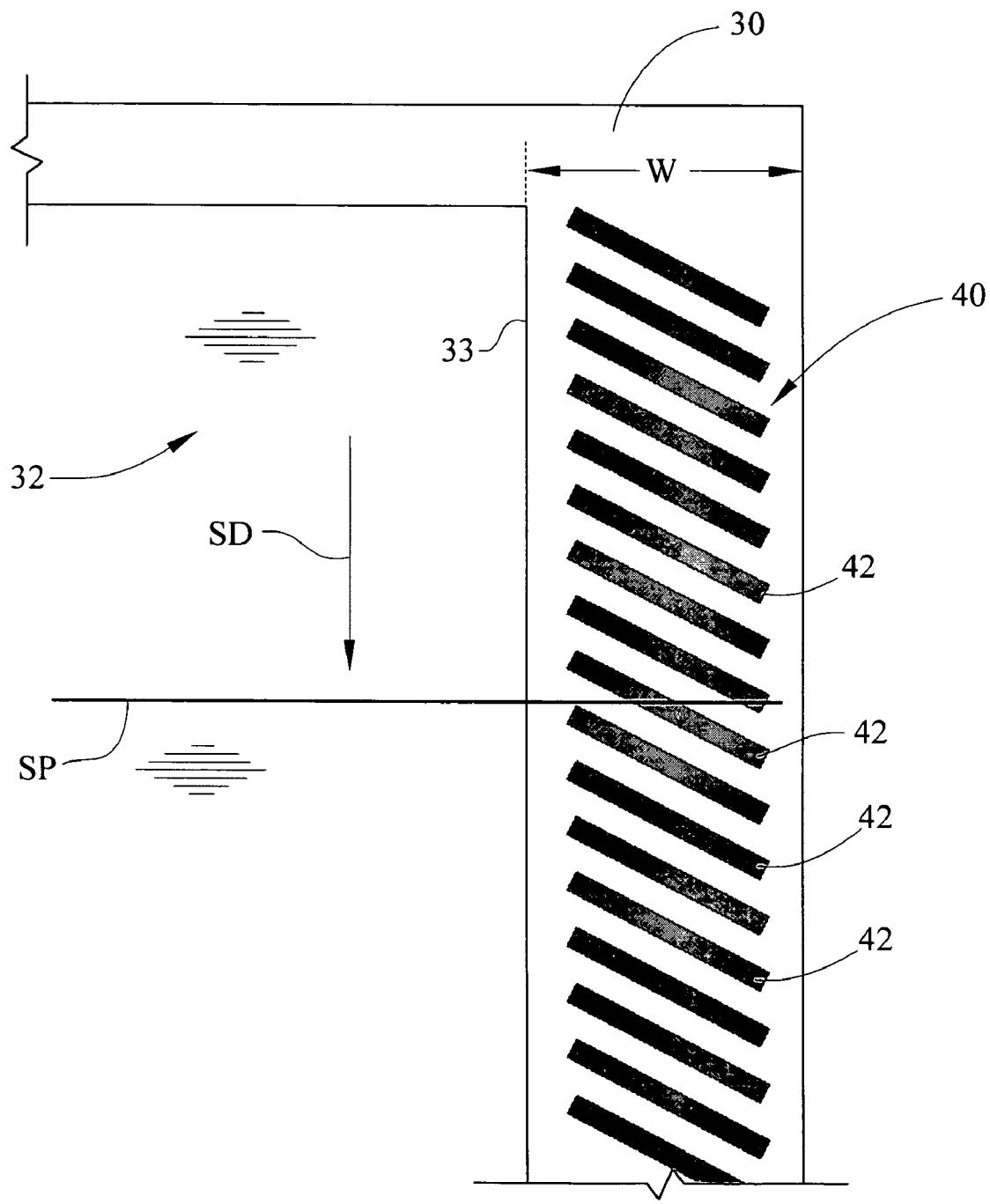
FIG. 3 is bottom view of a scanbar position in reference to the motion control pattern on the scan housing.

Referring now to FIG. 3, a bottom view of a portion of the scan housing 30 is shown in a close-up view to better depict the scan operation of the scanbar 34. Arrow SD depicts the normal direction of motion of the scanbar 34 when it is acquiring image data of the target disposed on the platen 32. Scanning can also occur when the scanbar is moving in a direction opposite to that depicted by arrow SD. Along the edge of the scan housing 30, the motion control pattern 40 is shown as a plurality of diagonal marks extending in a longitudinal scanning direction between the platen edge 33 and an outer edge of the scanner housing 30. The motion control pattern 40 is depicted as a dark color contrasting from the scanner housing 30. However, the motion control pattern 40 may be defined by a plurality of light colored marks if the lower surface of the scanner housing 30 comprises a dark color. Alternatively, the motion control pattern 40 may be formed by molding the pattern into the housing 30, utilizing a label comprising the motion control pattern 40, screen printing or pad printing a contrasting pattern 40 on the scanner housing 30. The arrow SD shown on the platen 32 depicts the scanning direction of the scanbar 34 and the scanbar 34 is depicted in FIGS. 3-8 at a scan position line SP. The scanbar 34 (FIG. 2) is depicted at the scan position line SP having a width that is greater than the width of the platen 32 such that the scanbar 34 extends several millimeters beyond the platen edge 33 towards the outer boundary of the scan housing 30. For example, if the width W between the platen edge 33 and the opposite edge of the motion control pattern 40 is between about 3-4 millimeters wide, an image sensor within the scanbar 34 scanning at 600 pixels per inch (ppi) may read between about 80-100 data points within the width W. Of course the number of pixels per inch will change with different scanning resolutions. For purpose of this description, the line 33 can represent a known reference point for use by the scanbar image sensor rather than the platen edge depending on whether a motion control pattern is utilized with an edge guide as described hereinafter.

Still referring to FIG. 3, the scan position line SP intersects the diagonal marks 42 of the motion control pattern 40. As the scan position line SP moves in the scanning direction SD, the scanbar 34 (FIG. 2) is continually acquiring scan data comprising image data from the platen 32 and motion control pattern data from the scanner housing 30. The scanbar 34, when located at scan position SP scans the marks 42, stores the mark data as part of the scan image data in the data buffer, distinguishes this mark data from mark data taken at subsequent scanning positions and from previous scanning positions due to the slope of the marks 42 and the shifting data representing light and dark areas, as described herein.

Figure 4:
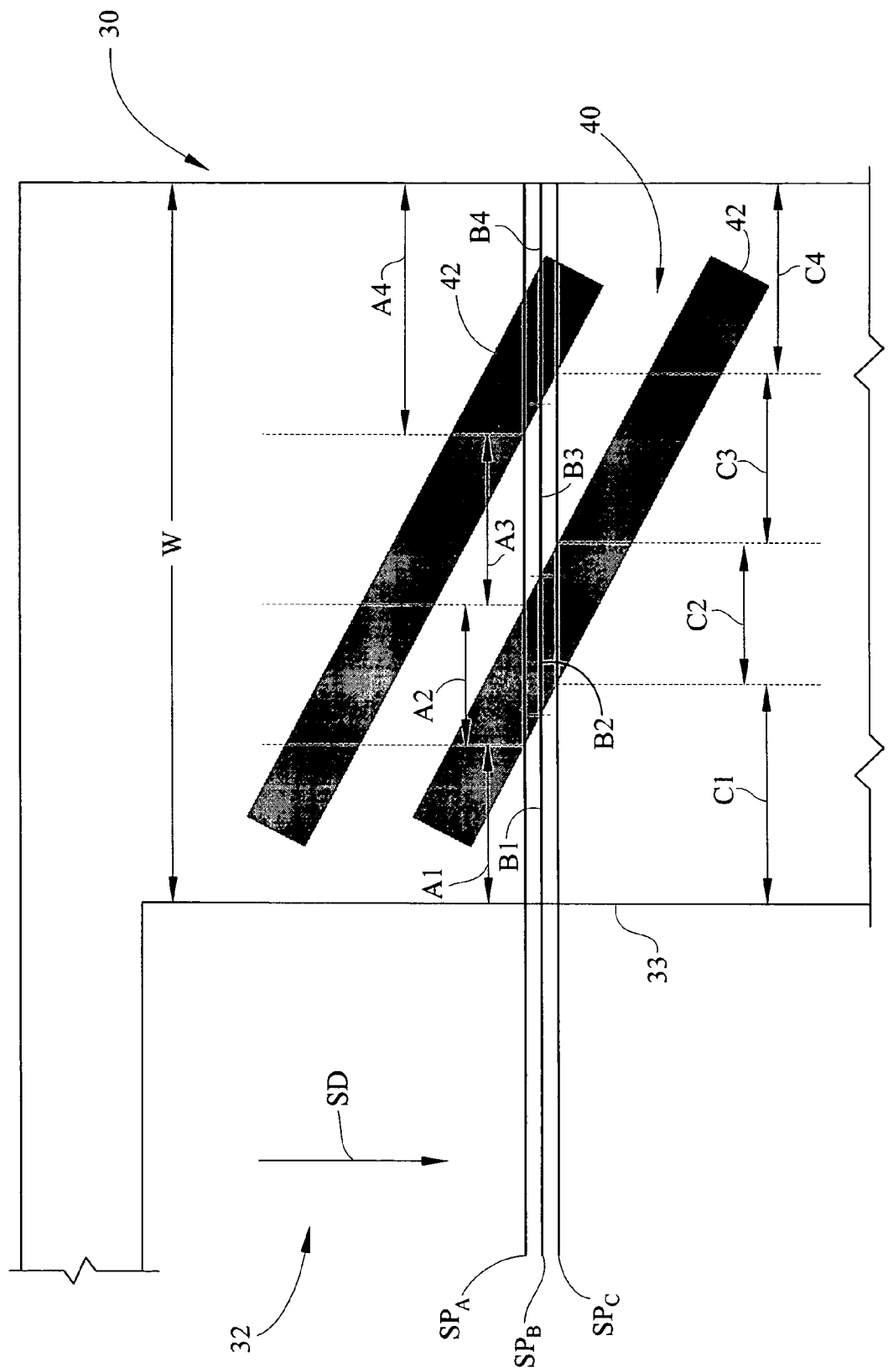
FIG. 4 is a bottom view of the lower scanner housing depicting multiple scan positions.

Referring now to FIG. 4, a bottom view of the scanner housing 30 and platen 32 is depicted showing multiple scan positions. Each of the scan position lines $SP_A$, $SP_B$ and $SP_C$ represents scan positions A, B and C, respectively, at different times in sequence and extends across both the platen 32 and across the scanner housing 30 including the motion control pattern 40 comprised of the plurality of marks 42. According to the present example, the width W of the scanner housing 30 is between about 3-4 millimeters and therefore may be scanned by, for example, 80 pixels or data points, when scanned using a scanbar with 600 pixels per inch (ppi) resolution.

Along scan position A depicted at $SP_A$, three broken vertical lines extend upwardly from the scan line $SP_A$ indicating the intersection of the scan line $SP_A$ with the marks 42 of the motion control pattern 40. Moving from left to right across the scan line $SP_A$, the first vertical line defines a width indicated as A1 between a known reference line or platen edge 33 and the first intersection with mark 42. A second width A2 is indicated between the first broken line and second broken line at an edge of mark 42. A third width A3 is defined between the second broken line and the third broken line at an edge of a mark 42. A fourth width A4 is defined between the third broken line and the end of the scan line $SP_A$. Each broken line defining the widths A1, A2, A3 and A4 extends from intersections of the scan position line $SP_A$ and the marks 42 of the motion control pattern 40. Thus, between the widths A1, A2, A3 and A4 are light and dark patterns which the scanner processor (not shown) can utilize and compare to determine in real time or in post-processing the location of the scanbar 34 along the platen 32 or scan data. In the present example, as previously indicated, the width W may represent 80 pixels. According to this example, the width A1 may represent data points 1-20 and may be a light color. The width A2 may represent data points 21-40 of $SP_A$ and may be represented by a contrasting dark color. The width A3 may represent data points 41-60 of $SP_A$ and may represent a light color. Finally, the width A4 may represent data points 61-80 of $SP_A$ and may be the contrasting dark color. Due to the slope of the marks 42 of the motion control pattern 40 at an immediately subsequent scanning position B, depicted as $SP_B$, where B equals (A+1), the width B1 of $SP_B$ may be represented by data points 1-21. Width B2 of $SP_B$ may be represented as data points 22-41. Width B3 of $SP_B$ may be represented data points 42-62. Width B4 of $SP_B$ may be represented as data points 63-80. The result of this design is that the slope of the marks 42 allows each scanning position to acquire a new set of data points and thereby distinguish previous and subsequent scanning positions by the different data points produced. Moreover, increased scanning resolution increases positional accuracy.

Scan position C indicated as line $SP_C$ may be some position (A+X), where X represents a mechanical tolerance that equates to some number of data lines or slices, for example, (A+2). As indicated in FIG. 4, the broken lines depicting width C1, C2, C3 and C4 have moved with respect to the broken lines defining A1, A2, A3 and A4 and B1, B2, B3 and B4. Thus, a new set of data is produced representing movement of the scanbar 34 and which further indicates a subsequent scan position $SP_C$. As clearly shown, the widths C1, C2, C3 and C4 differ in location from the widths of scan position A and scan position B. This data shifting clearly indicates movement of the scanbar 34. These reference points may be processed by the scanning processor (not shown) to determine an amount of movement of the scanbar 34. As previously indicated, the present descriptions represent an example where a scanner resolution is set to 600 pixels per inch and therefore the width W may be scanned with about 80 pixels or data points. However, if a scanner sensor image is scanning at 2,400 ppi, the pattern 40 and marks 42 are also being scanned at 2,400 ppi therefore the pattern image is acquired with increased accuracy. When scanned at 2400 ppi, there are more data points taken that represent marks 42, and therefore there are more points for discerning movement when comparing data from marks 42 from subsequent scans.

Figure 5:
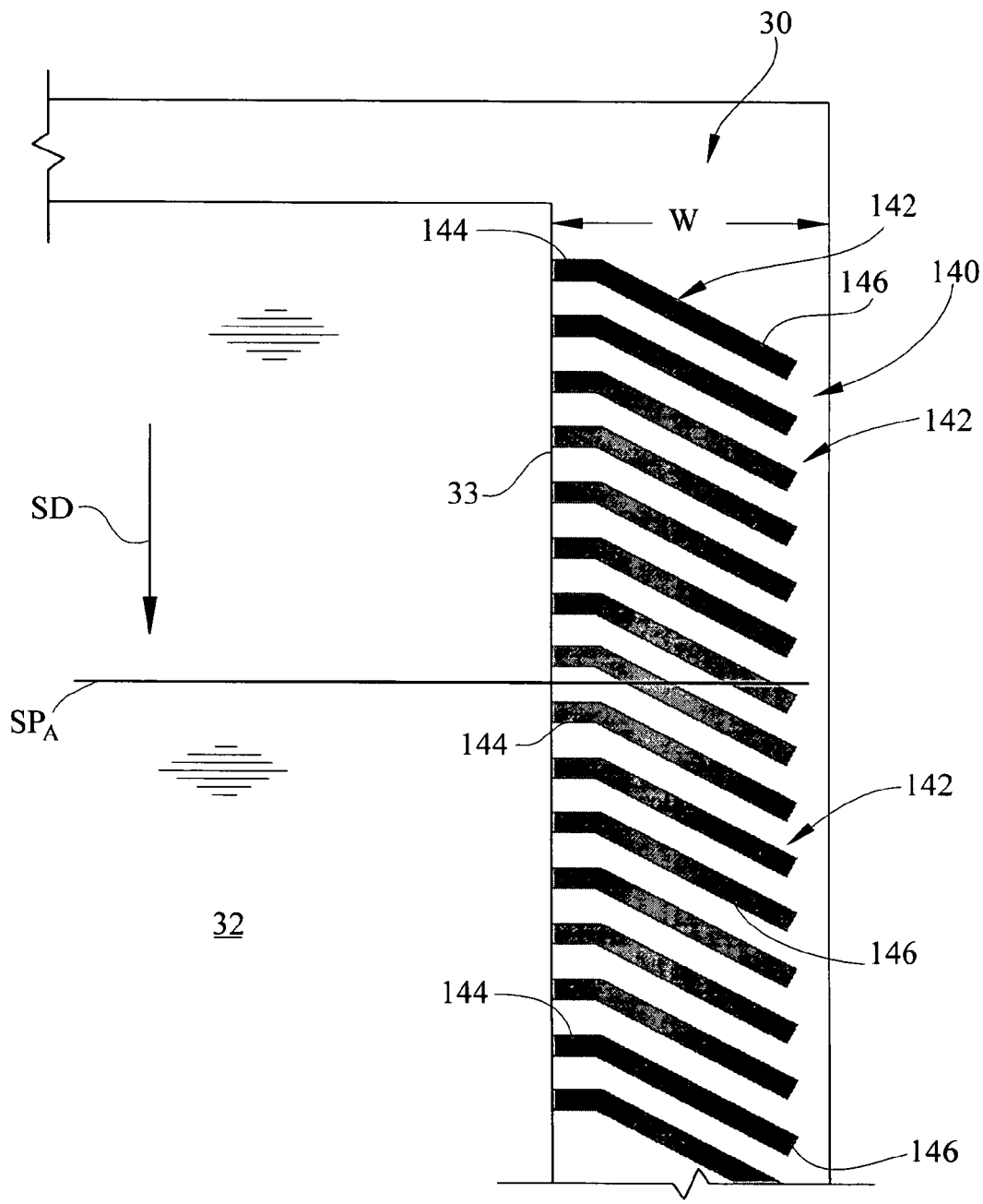
FIG. 5 is a bottom view of an exemplary scanner housing depicting a motion control pattern utilizing a scanner housing edge guide.

Referring now to FIG. 5, an alternative motion control pattern 140 is depicted comprising of a plurality of spaced apart marks 142 and includes an edge guide portion. The motion control pattern 140 extends along the undersurface of the scanner housing 30 from the platen edge 33 of the platen 32 across the scanner housing surface. The marks 142 comprise a horizontal leg 144 extending from the platen edge 33 and a diagonal or sloped portion 146. As previously described, a scanbar 34 (FIG. 2) moves in a scan direction SD indicated by the arrow and scans a target document placed on the upper surface of the platen 32. The scanbar 34 moves through a plurality of scanning positions, one such scanning position $SP_A$ is depicted in FIG. 5. Since the marks 140 extend to the platen edge 33 the image sensor and processor may determine the edge of the platen 32 as is useful in full-page scanning.

Figure 6:
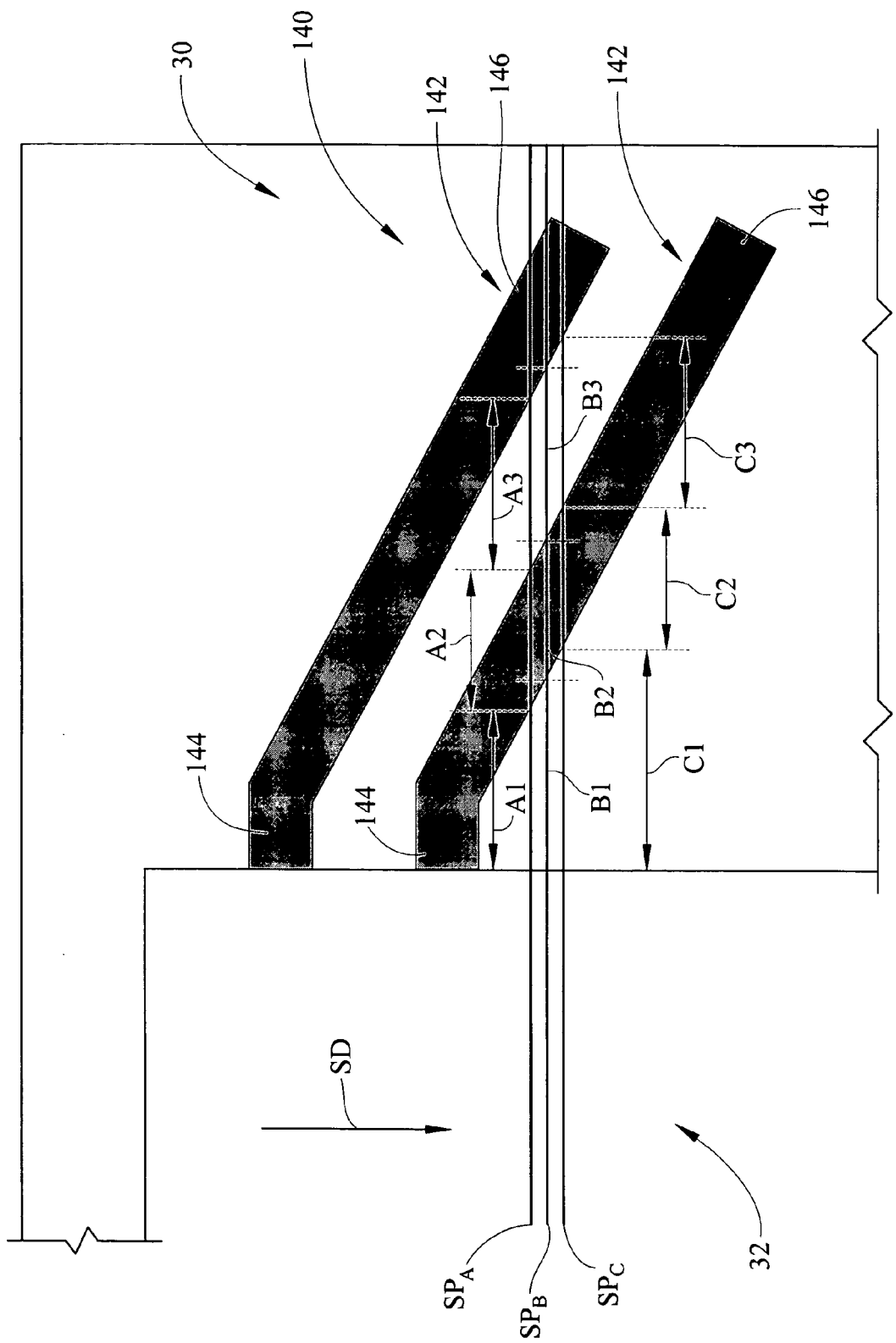
FIG. 6 is a bottom view of a scanner housing having a motion control pattern with scanner housing edge guide.

FIG. 6 depicts a close up view of a lower surface of the scanner housing 30 and the alternative motion control pattern 140 of FIG. 5. The horizontal portion 144 is utilized as a mark to determine the edge of the scanning platen and therefore to distinguish between the scanning platen 32 and the motion control pattern 140 disposed on the lower surface of the scanner housing 30. The horizontal portion 144 extends from the platen 32 so that it can be utilized as an edge guide to locate the platen edge 33 for full-page scanning. The diagonal portion 146 is utilized, as previously described, to determine position of the scanbar 34. As shown, three scanning positions are shown $SP_A$, $SP_B$ and $SP_C$. Each scan position intersects the diagonal portion 146 defining zones A1, A2, A3, B1, B2, B3, and C1, C2 and C3 as shown. As previously discussed, the shifting data zones from $SP_A$ to $SP_B$ and to $SP_C$ indicate movement of the scanbar 34 between scan positions.

Figure 7:
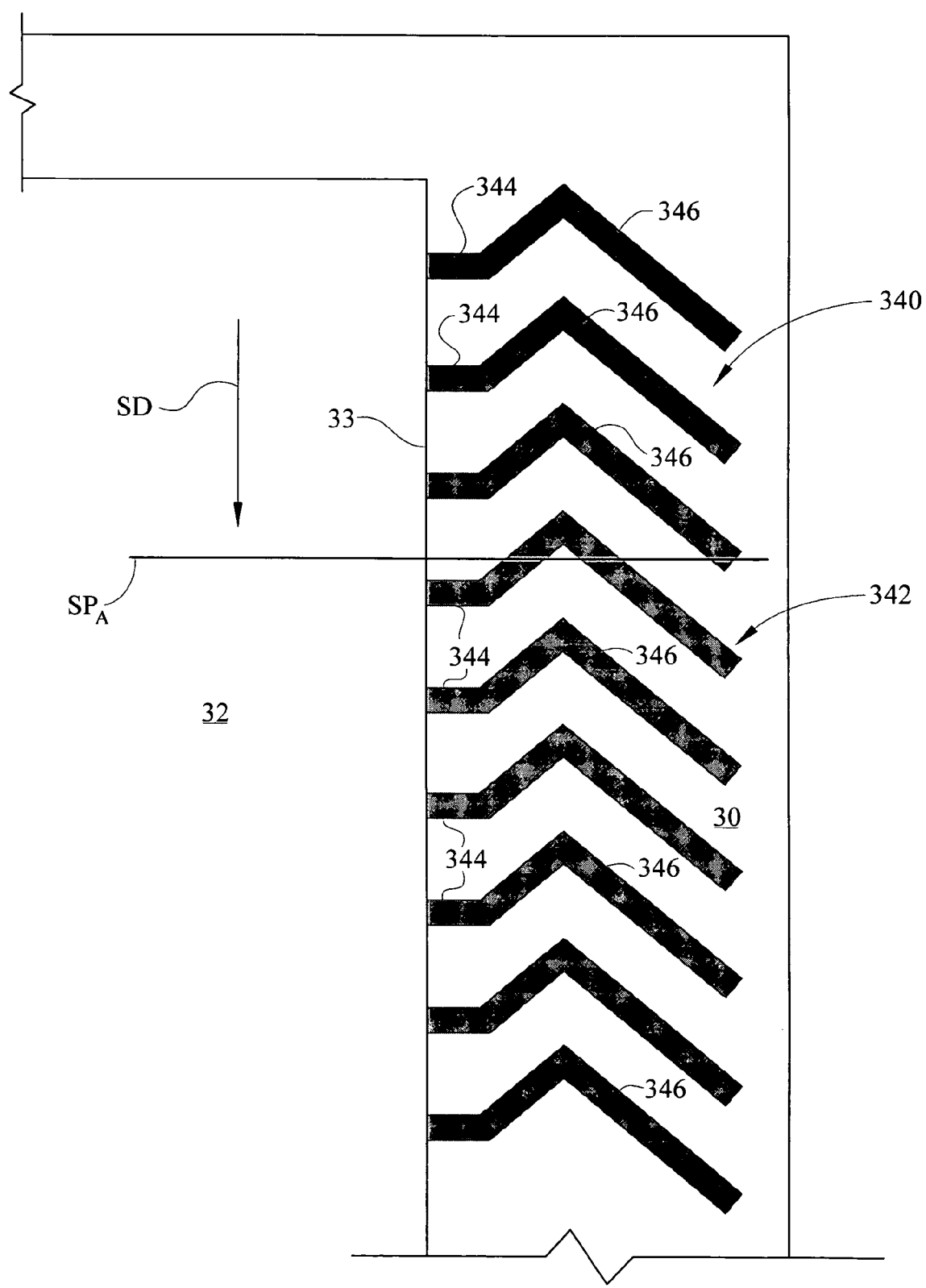
FIG. 7 is a bottom view of the scanner housing having an alternative motion control pattern and scanner housing edge guide.

FIG. 7 depicts yet a further alternative motion control pattern 340 comprising a plurality of spaced marks 342. Each mark comprises a horizontal portion 344 extending from the platen edge 33 for use in recognizing the platen edge 33 for full-page scanning. Further, each mark 342 comprises a chevron 346 having two opposed sloping or angled lines which can be used to recognize movement of the scanbar 34. The chevrons 346 are comprised of a dark color which is contrasting from the scanner housing 30. Alternatively, if the scanner housing 30 is dark then the chevrons 346 can be light in color.

Figure 8:
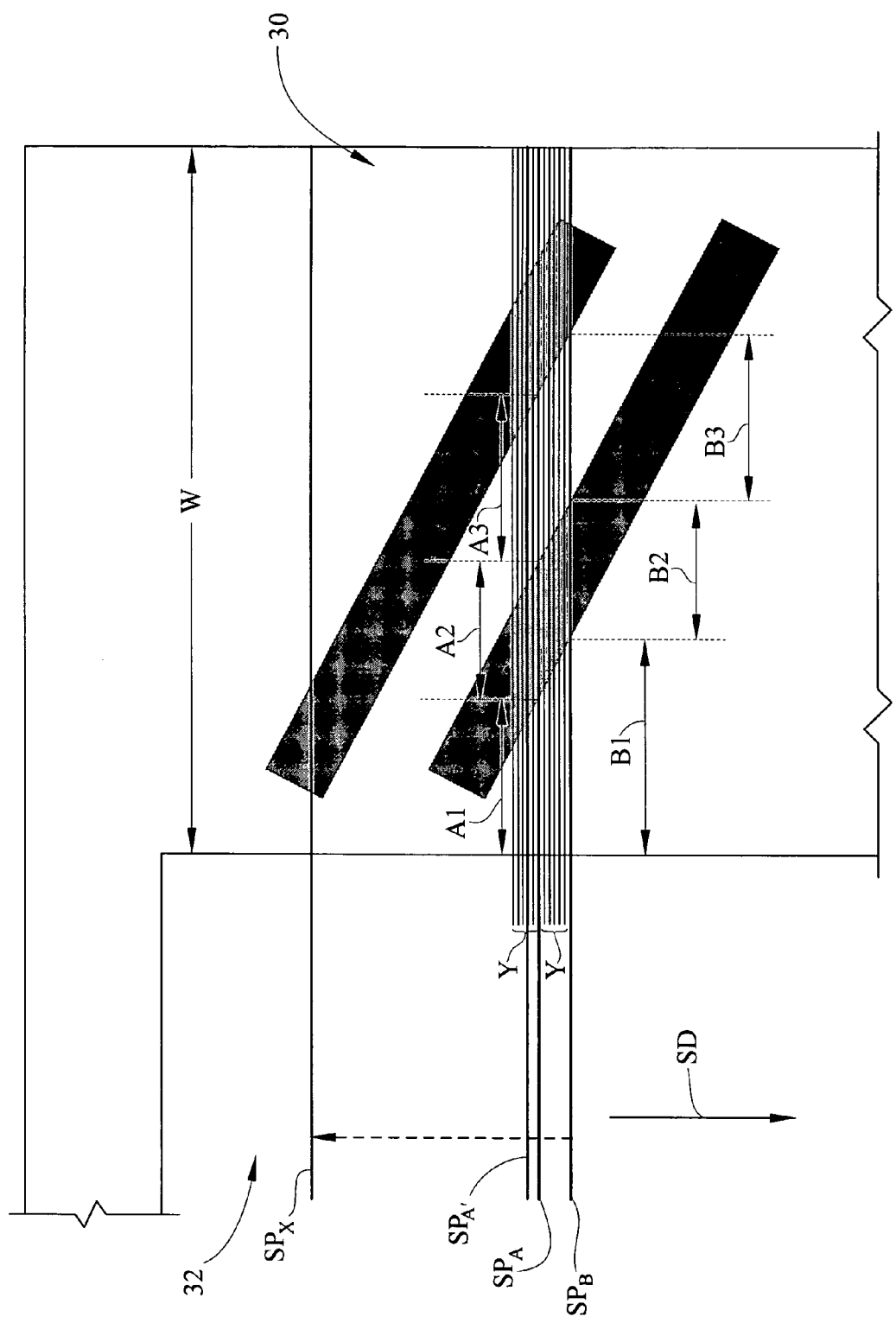
FIG. 8 is a bottom view of the scanner housing and motion control pattern depicting motion of the scanbar during operation; and, FIG. 9 is a flow chart depicting a method of operation of the present invention.
Figure 9:
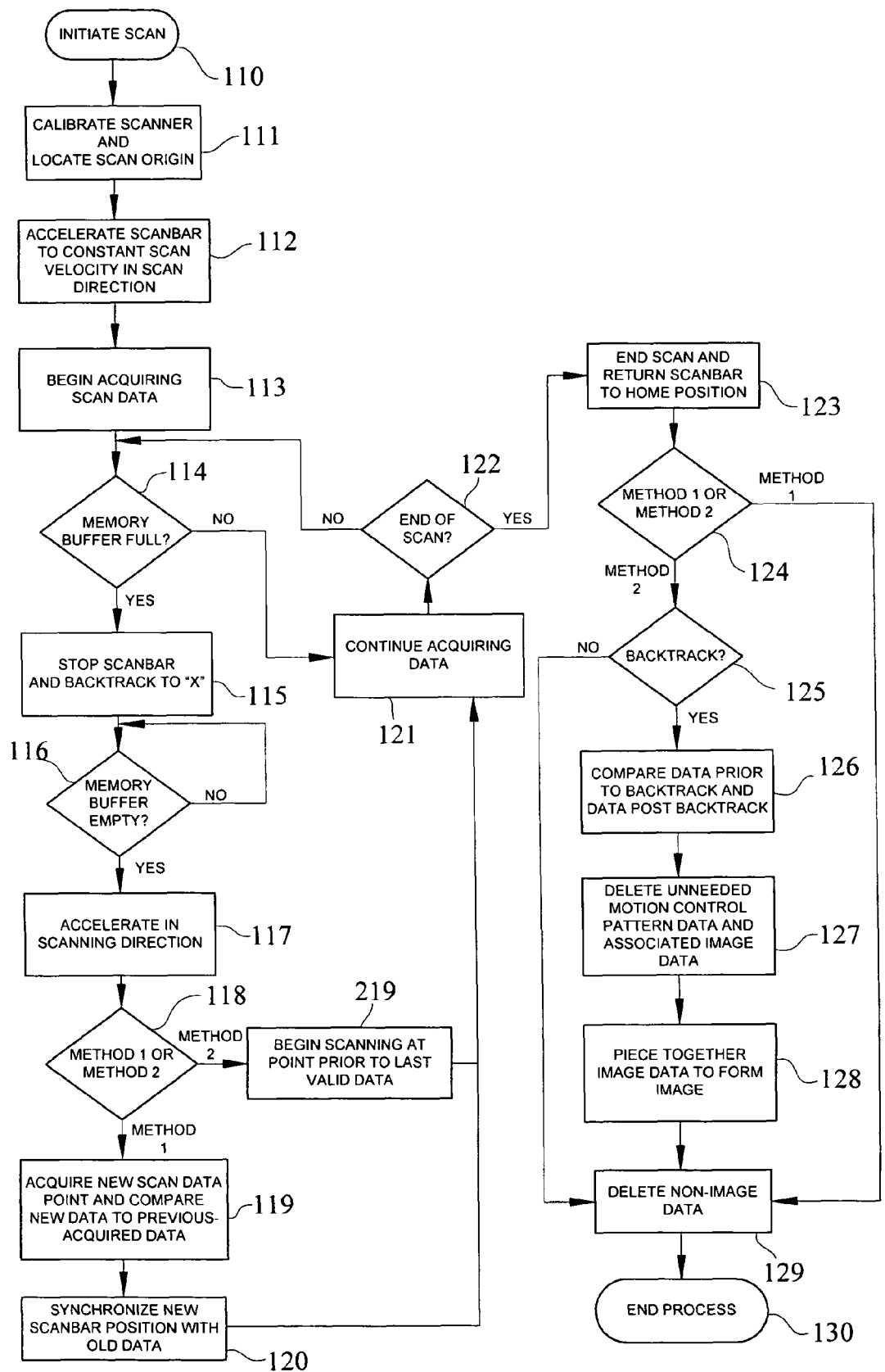

Referring now to FIGS. 8 and 9, the operation of the improved motion control method is described and shown. First, a user starts the method at 110 by initiating a scan action. The scan can be initiated at the scanner via a control panel 11 (FIG. 1) or by a personal computer in electronic communication with the peripheral device 10 (FIG. 1). When the scan action is initiated at 110, the scanbar 34 (FIG. 2) is calibrated and the scan origin is located at 111. Alternatively, the scan origin can be located first followed by calibration of the image sensors within the scanbar 34. When the scanbar 34 reads the origin mark 36 (FIG. 2) the processor recognizes that the scanbar 34 is properly positioned in a home position and can begin scanning. Thus, the origin mark 36 is typically positioned at the same corner of the platen 32 as the justification mark. Alternatively, origin mark 38 can be positioned adjacent a side of the platen 32 rather than at a corner. In this case the origin mark 38 may be in the middle of the calibration strip 35 rather than a corner wherein the home position can be the center of the minor axis of the platen 32.

After calibration and location of the scan origin at 111, the scanbar 34 is accelerated from the home position to a scan velocity in the scan direction SD at 112. Upon reaching a substantially constant scan velocity, the scanbar 34 begins acquiring image data and motion control pattern data at a first scan position at 113. The first scan position can be at or around the interface between the scanner housing 30 and platen 32. As the scanbar 34 continues moving in the scan direction and acquiring scan data comprising both image data and motion control pattern data, the processor continuously queries whether the image memory buffer is full at 114. The image memory buffer can become full when the image sensors of scanbar 34 acquire data at a faster rate than the scanner processor (not shown) can process the scan data and motion control pattern data. In addition, the image memory buffer need not be completely full. Rather, the image memory can comprise a maximum threshold and a minimum threshold, which may or may not be reached before the memory buffer is completely full or completely empty, respectively. In other words, these are pre-selected values. If the answer to the query at 114 is no, the scanbar 34 continues acquiring data at 121. If the answer at 114 is yes, the scanbar 34 stops and backtracks at 115. For example, as shown in FIG. 8, the scanbar 34 can be taking both image data and motion control pattern data at some position whereupon the memory buffer becomes full, as illustrated, at scan position B, indicated as $SP_B$. At scan position $SP_B$, after taking the last valid data, the scanbar 34 stops its motion in the scanning direction SD and reverses direction to a scan position X, depicted at $SP_X$. The distance between scan position $SP_B$ and scan position $SP_X$ represents (1) a distance required to accelerate the scanbar 34 from zero velocity to a substantially constant scan velocity, and/or (2) the mechanical positional tolerance of the scanbar 34 and/or (3) the calculation time for motion control pattern comparison, also known as look-ahead time and (4) combinations of the foregoing. For example, the scanbar 34 may require 5 millimeters to accelerate to constant velocity and may be accurate to within 0.5 millimeter, thus the scanbar 34 may reverse from the last valid scan data about 5.5 millimeters. The scanbar may be accelerated for about 5 millimeters and may acquire a data line at 5 millimeters in order to compensate for the 0.5 millimeter mechanical positional tolerance and ensure that no data is missed during scanning. The calculation time for a controller of sufficient power and speed should be nearly zero and is disregarded in this example.

Alternatively, the mechanical positional tolerance of the scanbar 34 can be equated to data slices where each data slice is a scan position. As previously indicated, the scanbar 34 of the present exemplary description can utilize an image sensor scanning image data and motion control pattern data at a resolution of 600 pixels per inch (ppi). Further, according to the exemplary embodiment, such scanbar 34 can have a mechanical positional tolerance Y, where Y is $5/600^{th}$ of an inch or five data slices. As shown in FIG. 8, Y lines are shown immediately before and immediately following scan position A originally acquired before the backtrack. These lines represent the mechanical positional tolerance for the scanbar 34 and calculation time for pattern comparison, which in this example is assumed to be nearly zero for simplicity as previously indicated.

According to the present example, the scanbar 34 begins accelerating at 117 in the scanning direction from scan position X toward scan position B, where the last valid data was acquired. At position 118 the processor can determine which method to utilize in backtracking artifact reduction. If the first method of real-time analysis is utilized, then the scanbar 34 obtains a new scan data line at 119 estimated to be near a scan data line obtained prior to the backtracking at 115. For example, when the scanbar 34 is generally located around scan position A, the image sensor acquires a new data line at scan position A' (indicated for purposes of illustration as line $SP_{A'}$) and compares the new motion control pattern scan line taken at scan position A' to the motion control pattern scan data previously taken before backtracking at 115. More specifically, the scanbar 34 acquires a new scan line at position A', and begins comparing data from position A' to the valid data taken from scan positions (A−Y) through (A+Y) to find the closest match at 119. As previously indicated Y represents the mechanical positional tolerance of the scanbar 34 and according to the present example, Y is equal to five data slices or $5/600^{th}$ of an inch. However, this number can vary based upon design choices, costs of implementation and the like. In any event, many best-fit algorithms are known and can be utilized to compare the new scan position A' and original scan positions (A−Y) through (A+Y) in order to determine a best-fit match and determine the location of the scanbar 34. Alternatively, multiple data points before or after scan position A' can be compared to multiple original scan points using the best-fit analysis and obtain a higher level of accuracy and confidence in the match results. Once the one or more original and new data points are matched by the best-fit algorithm then the processor can correlate the current position of the scanbar 34 with the last valid data line taken at scan position B ($SP_B$). More specifically, since the distance between scan positions A and B are known, then the distance between the current data line at scan position A' and scan position B can be determined. A separate comparison buffer may be needed for the processor to compare the old data and the new data for synchronization. During this comparison, the scanbar 34 synchronizes the new scan positions with the old scan positions at 120 by finding a best-fit match between scan position A and the data acquired between scan positions (A−Y) and (A+Y) and correlating the old data and new position data of the scanbar 34. Once the new scan position is synchronized at 120 with the old scan position, the scanbar 34 begins taking data at scan position (B+1) immediately after the last valid data taken at scan position B, represented at 121. The scanbar 34 continues acquiring data at 121 and queries whether the end of the scan has been reached at 122. If the answer is yes, the scan of method one ends and the scanbar 34 returns to its home position at 123. If the answer is no at 122, the processor queries whether the memory full threshold has been met at 114. If the answer at 114 is yes, the process repeats at 114 until the memory full threshold is passed or the scan action is complete at 123. After the scan is complete at 123 and the processor confirms that the first method is being utilized at 124, the non-image data is deleted at 129. The non-image data can include motion control pattern data as well as edge guide data.

According to a second method of operation at 118, instead of utilizing the motion control pattern data in order to ascertain real-time positioning and synchronization of the scanbar 34 and inhibit backtracking artifacts, the motion control pattern data can alternatively be utilized in a post-processing method as a key to piece together image data scanned during a scan action at position 121. This method is similar to the first method described herein, however, instead of performing a real-time analysis of the position of the scanbar 34, a post-processing analysis is performed at 126 to determine which data represents duplicate scan data, delete the duplicate scan data at 127, and thereafter piece together the remaining valid image data at 128. The selection of first or second method to utilize can be preprogrammed or can be user selected, for instance, at the control panel 11. This is depicted at 118 as occurring during the scanning process but such selection can also be made prior to beginning the scanning process and the processor can, for example, merely look for that selection during operation at 118. According to the second post processing method of operation also depicted in FIG. 9, a scan action is started at 110 by a user initiating a scan action as previously described at the control panel 11 or by a computer in electronic communication with the peripheral device 10. After the scan action is initiated at 110, the scanner is calibrated and the scan origin is located at 111. Alternatively, the scan origin can be located first followed by calibration of the scanner as previously described. After these actions occur at a home position, the scanbar 34 is accelerated from zero velocity to a scan velocity in a scan direction SD at 112 and the scanbar 34 and image sensors therein begin acquiring image data and motion control pattern data at 113 typically at or around the first platen edge encountered in the scanning direction SD. The scanbar 34 continues acquiring image data and motion control pattern data until the image memory buffer is full or a pre-selected threshold is met at 114.

Once such condition is met, the scanbar 34 stops and reverses the scan direction to a backtrack restart position, indicated in FIG. 8 as scan position X at 115. From this scan position X to scan position B, where the last valid data was taken before backtracking, the distance is equal to a distance required to achieve scan velocity plus mechanical positional tolerance for the scanbar 34. When the memory buffer is empty or reaches a preselected empty threshold at 116, the scanbar 34 is accelerated at 117 to the substantially constant scan velocity. The processor is also querying whether the process is a real-time analysis as previously described or a post-processing method at 118. According to the second method of operation, once the scanbar 34 reaches the scan velocity, the image sensor within scanbar 34 begins acquiring scan data at 219, at a position slightly before the last valid data point taken. For example, although the last valid data was taken at scan position B, the scanbar 34 begins taking data at scan position A to ensure that all image data is captured and continues taking data at 121 until either the processor determines at 122 that the scan action is complete at 123 or until the image memory buffer is full or a preselected full threshold is met at 114. Further, multiple backtrack operations may be necessary when the memory buffer reaches a preselected full threshold. In any event, at the end of the scan process, the scanbar 34 returns home at 123. At this point, the processor queries whether this action was performed as a first method or second method at 124. According to this embodiment, wherein the second method is utilized, the processor queries at 125 if backtracks occurred during the scan process. If no backtracks occurred, then the non-image data is deleted at 129. As previously indicated such data can include motion control pattern data as well as edge guide data, if it is utilized. Afterward, the process ends at 130. If, however, backtracks are determined at 125 to have occurred during the scan process, then motion control pattern data from before each backtrack is compared to motion control pattern data after each backtrack or post-backtrack at 126. For example, for a single backtrack procedure, a last valid scan data, including motion control pattern data, can be compared to a plurality of new scan data lines taken immediately before and after the known position of the last valid data line. According to an alternative step, a new scan data line, including motion control pattern data, can be taken and compared to a plurality of motion control pattern data lines immediately prior to the backtrack. Based on the comparison at 126, unneeded or duplicate scan data comprising motion control pattern data and associated image data is deleted at 127. After the duplicate scan data is deleted, the remaining image data is pieced together to form an image which can be processed or saved as previously described at 128. After the image data is pieced together, the non-image data is deleted at 129. At this point, the process ends at 130.

In general the motion control patterns is designed such that the scanbar will intersect at least two adjacent marks within the series of the marks in order to increase reliability and increase positional data. However, the disclosed methods will also function with the scanbar intersecting a single angled or sloped mark within the series of marks, or, in other words, the marks can be spaced further apart then what is illustrated in the figures.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method of scanning a target image and inhibiting backtrack artifacts from the scanned image, comprising:
    initiating a scan on a flat bed scanner, said flat bed scanner comprising at least a scanbar, a memory buffer and a motion control pattern comprised of a plurality of spaced elements, each element having an angled portion with respect to the motion of the scanbar;
    acquiring scan data for at least one scan position line with said scanbar, said scan data comprising a motion control pattern data and an image data, said motion control pattern data comprising, for each scan position line, a plurality of light patterned line segments and a plurality of dark patterned line segments;
    storing said previously acquired scan data in a memory buffer;
    querying whether said memory buffer reaches a preselected full threshold;
    acquiring a last valid scan data at a last valid scanbar position;
    stopping and backtracking said scanbar when said memory buffer preselected full threshold is met;
    acquiring, following the backtracking, at least one new scan data line, each of said at least one new scan data line including a plurality of light patterned line segments and a plurality of dark patterned line segments; and,
    inhibiting backtrack artifacts by one of a first real-time position analysis and a post-processing analysis by comparing a position of at least one of said line segments of said at least one scan position line acquired prior to backtracking to a position along the new scan data line of at least one of said line segments of the new scan data line.

2. The method of claim 1 further comprising accelerating said scanbar in a scanning direction when said memory buffer is below a preselected empty threshold.

3. The method of claim 1 further comprising synchronizing a new scanbar position to an old scanbar position with said previously acquired scan data.

4. The method of claim 3 further comprising synchronizing a new scanbar position to an old scanbar position by correlating a new scan data to said previously acquired scan data.

5. The method of claim 1 further comprising resuming scanning immediately following said last valid scan data.

6. The method of claim 1 further comprising resuming scanning when a preselected empty memory buffer threshold is met.

7. The method of claim 6 further comprising resuming said scanning at a distance equal to at least a mechanical positional tolerance before a last valid scanbar position.

8. The method of claim 6 further comprising resuming said scanning at a distance equal to a mechanical positional tolerance and a distance required to accelerate to a constant scan velocity.

9. The method of claim 1 further comprising piecing together scan data by comparing said motion control pattern data of the new scan data line and said motion control pattern data acquired prior to said backtracking to form an image comprising said image data.

10. The method of claim 1 further comprising deleting duplicate motion control pattern data and image data.

11. The method of claim 10 further comprising piecing together said scan data by comparing said motion control pattern data of the new scan data line and said motion control pattern data acquired prior to said backtracking to form an image comprising said image data.

12. The method of claim 1, wherein said flat bed scanner comprises a platen on which a target document rests during a scan operation, and each spaced element comprising a first portion having a longitudinal axis which is angled with respect to the motion of the scanbar and a second portion having a longitudinal axis which is substantially perpendicular to the motion of the scan bar, the second portion disposed between the first portion and said platen and terminating at an edge of said platen.

13. The method of claim 1, wherein each spaced element comprises a first portion having a longitudinal axis disposed at a first angle relative to the motion of the scan bar, and a second portion having a longitudinal axis disposed at a second angle relative to the motion of the scan bar, the first angle and the second angle being substantially perpendicular to each other, the first angle being acute with respect to the motion of the scan bar.

14. The method of claim 1, wherein at least one said dark patterned line segment of the at least one scan position line acquired prior to backtracking and at least one said dark patterned line segment of the new scan data line are substantially the same length.

15. The method of claim 1, wherein the comparing comprises determining an amount of shift, along the at least one new scan data line, of at least one said dark patterned line segment of the at least one new scan data line, relative to the position of at least one said dark patterned line segment of the at least one scan position line acquired prior to backtracking.

16. The method of claim 1, wherein the comparing further comprises comparing a position of at least one said light patterned line segment of the at least one scan position line acquired prior to backtracking to a position along the at least one new scan data line of at least one said light patterned line segment of the at least one new scan data line.

17. The method of claim 16, wherein the at least one light patterned line segment of the at least one scan position line and the at least one light patterned line segment of the new scan data line are substantially the same length.

18. The method of claim 1, wherein the comparing comprises comparing positions of a plurality of said dark patterned line segments of the at least one scan position line acquired prior to backtracking to positions along the new scan data line of a plurality of said dark patterned line segments of the new scan data line.

19. The method of claim 18, wherein a distance between the plurality of said dark patterned line segments of the at least one scan position line acquired prior to backtracking and a distance between the plurality of said dark patterned line segments of the new scan data line are substantially equal.

20. The method of claim 18, wherein a distance between the plurality of said dark patterned line segments of the at least one scan position line acquired prior to backtracking and a distance between the plurality of said dark patterned line segments of the new scan data line are not equal.

21. The method of claim 1, wherein at least one dark patterned line segment in a scan position line has a length which is substantially equal to a length of at least one dark patterned line segment in each scan position line.

22. A method for positioning and re-positioning a scanbar of a flat bed scanner, comprising:
   initiating a scan of a target document by acquiring scan data for at least one scan position line, said scan data including motion control pattern data and image data; said motion control pattern comprised of a plurality of spaced elements, each element having an angled portion with respect to the motion of the scanbar, said motion control pattern data for each of said at least one scan position line comprising a plurality of light patterned line segments and a plurality of dark patterned line segments;
   determining that a memory buffer has reached a preselected full threshold and acquiring a last valid scan data at a last valid scanbar position;
   backtracking said scanbar to a backtrack position;
   accelerating said scanbar in a scan direction to a substantially constant velocity from said backtrack position;
   acquiring a new scan data including a new motion control pattern data at a new scanbar position prior to said last valid scanbar position, said new motion control pattern data at said new scanbar position comprising a plurality of light patterned line segments and a plurality of dark patterned line segments;
   comparing said new motion control pattern data to said motion control pattern data acquired before said backtracking, comprising comparing a position of at least one of said line segments of a scan position line of said new motion control pattern data of said new scan data to a position of at least one of said line segments of a scan position line of said motion control pattern data acquired before said backtracking;
   synchronizing said new scanbar position and said last valid scanbar position based upon said comparing; and
   continuing scanning at a position immediately after said last valid scanbar position.

23. The method of claim 22 further comprising determining that said memory buffer has reached a preselected empty threshold before said accelerating.

24. The method of claim 22, said backtrack position including a distance for accelerating said scanbar to constant scan velocity.

25. The method of claim 24, said backtrack position including a distance for a mechanical positional tolerance of said scanbar.

26. The method of claim 22, further comprising performing a best-fit match of said new scan data to said scan data acquired before said backtracking.

27. The method of claim 22, further comprising performing a best-fit match utilizing a plurality of said new scan data and said scan data acquired before said backtracking for better accuracy.

28. The method of claim 22, said new scan data line being spaced apart from said last valid scan data by about a mechanical positional tolerance.

29. The method of claim 22 further comprising determining said scanbar location after said accelerating with respect to said last valid scanbar position.

30. The method of claim 22, wherein the flat bed scanner includes a transparent platen, and each spaced element comprises a first portion having a longitudinal axis which is angled with respect to the motion of the scanbar and a second portion having a longitudinal axis which is substantially perpendicular to the motion of the scan bar, the second portion disposed between the first portion and the platen and terminating at an edge of said platen.

31. The method of claim 22, wherein each spaced element comprises a first portion having a longitudinal axis disposed at a first angle relative to the motion of the scan bar, and a second portion having a longitudinal axis disposed at a second angle relative to the motion of the scan bar, the first angle and the second angle being substantially perpendicular to each other, the first angle being acute with respect to the motion of the scan bar.

32. The method of claim 22, wherein a length of at least one of the line segments of the scan position line of said new scan data and at least one of said line segments of a scan position line of said motion control pattern data acquired before said backtracking have substantially equal length.

33. A method of post-processing scan data and inhibiting backtrack artifacts, comprising:
  initiating a scan on a flat bed scanner, said flat bed scanner comprising at least a scanbar, a memory buffer and a motion control pattern comprised of a plurality of spaced elements, each element having an angled portion with respect to the motion of said scanbar; acquiring scan data for at least one scan position line, said scan data comprising a motion control pattern data and an image data, said motion control pattern data comprising, for each scan position line, a plurality of light patterned line segments and a plurality of dark patterned line segments;
  backtracking said scanbar when said memory buffer reaches a preselected full threshold;
  accelerating said scanbar in a scan direction to a substantially constant velocity from said backtrack position;
  continuing to acquire scan data when said memory buffer empties below a preselected empty threshold until entire scan data is acquired;
  comparing said scan data acquired prior to said backtracking and said scan data acquired following said backtracking after the entire scan data is acquired, said comparing comprising comparing a position of at least one of said line segments of at least one scan position line acquired prior to said backtracking to a position of at least one of said line segments of at least one scan position line acquired following said backtracking, said comparison corresponding to a shift in position of the at least one of said line segments of the at least one scan position line acquired following said backtracking, relative to the position of the at least one line segment of the at least one scan position line acquired prior to said backtracking;
  deleting duplicate scan data; and,
  forming a scanned image from said scan data.

34. The method of claim 33, said duplicate data having a width at most equal to a mechanical positional tolerance of said scanbar.

35. The method of claim 33, said duplicate scan data being data which is scanned both during said initial acquiring scan data and said continuing to acquire scan data.

36. The method of claim 33, wherein said flat bed scanner comprises a transparent platen, and each spaced element comprises a first portion having a longitudinal axis which is angled with respect to the motion of the scanbar and a second portion having a longitudinal axis which is substantially perpendicular to the motion of the scan bar, the second portion disposed between the first portion and the platen and terminating at an edge of said platen.

37. The method of claim 33, wherein each spaced element comprises a first portion having a longitudinal axis disposed at a first angle relative to the motion of the scan bar, and a second portion having a longitudinal axis disposed at a second angle relative to the motion of the scan bar, the first angle and the second angle being substantially perpendicular to each other, the first angle being acute with respect to the motion of the scan bar.

38. A method of scanning a target image and inhibiting backtrack artifacts from the scanned image, comprising:
  initiating a scan on a flat bed scanner, said flat bed scanner comprising at least a scanbar, a memory buffer and a motion control pattern comprised of a plurality of spaced elements, each element having an angled portion with respect to the motion of the scanbar,
  acquiring scan data for at least one scan position line with said scanbar, said scan data comprising a motion control pattern data and an image data, said motion control pattern data for each of said at least one scan position line comprising a plurality of scan position line segments of a first light reflective attribute and a plurality of scan position line segments of a second light reflective attribute;
  storing said previously acquired scan data in a memory buffer;
  querying whether said memory buffer reaches a preselected full threshold;
  acquiring a last valid scan data at a last valid scanbar position;
  stopping and backtracking said scanbar when said memory buffer preselected full threshold is met;
  acquiring, following the backtracking, at least one new scan data line, each of said at least one new scan data line including a plurality of line segments having the first light reflective attribute and a plurality of line segments having the second light reflective attribute; and
  inhibiting backtrack artifacts by one of a first real-time position analysis and a post-processing analysis comprising comparing a position of a line segment having the first light reflective attribute of at least one scan position line acquired prior to backtracking to a position along said at least one new scan data line of a line segment of the new scan data line having the first light reflective attribute.

39. The method of claim 38, wherein a length of a line segment of a scan position line having the first reflective light attribute is substantially identical to a length of a line segment having the first reflective light attribute in every other scan position line.

40. The method of claim 38, wherein the comparing further comprises comparing a line segment having the second reflective light attribute of the at least one scan position line acquired prior to backtracking to a position along said at least one new scan data line of a line segment of the new scan data line having the second light reflective attribute.

41. The method of claim 38, wherein the line segments having the first light reflective attribute comprise dark line segments and the line segments having the second light reflective attribute comprise light line segments, relative to the dark line segments.

42. The method of claim 38, wherein the line segments having the first light reflective attribute comprise light line segments and the line segments having the second light reflective attribute comprise dark line segments, relative to the light line segments.

43. The method of claim 38, wherein the line segment having the first light reflective attribute of the at least one scan position line acquired prior to backtracking and the line segment of the new scan data line having the first light reflective attribute are substantially the same length.

44. The method of claim 38, wherein the comparing comprises comparing an amount of shift of the line segment of said at least one new scan data line having the first light reflective attribute relative to the position of the line segment having the first light reflective attribute of at least one scan position line acquired prior to backtracking.

* * * * *